June 12, 1951  J. HAESLER  2,556,916
PARACHUTE CANOPY

Filed May 24, 1947  3 Sheets-Sheet 1

INVENTOR
JOHN HAESLER
BY *Darby & Darby*
ATTORNEYS

June 12, 1951  J. HAESLER  2,556,916
PARACHUTE CANOPY

Filed May 24, 1947  3 Sheets-Sheet 3

INVENTOR
JOHN HAESLER
BY Darby&Darby
ATTORNEY

Patented June 12, 1951

2,556,916

UNITED STATES PATENT OFFICE 2,556,916

PARACHUTE CANOPY

John Haesler, Teaneck, N. J., assignor to The Duplan Corporation, Hazelton, Pa., a corporation of Delaware Application May 24, 1947, Serial No. 750,218

3 Claims. (Cl. 244—145)

The object of my invention is to produce a parachute canopy which will have characteristics superior to those now in use. These characteristics are improved stability, ability to absorb increased opening shock, improved reliability, simplified manufacture, reduced servicing requirements, and increased economy.

My new parachute canopy is characterized by having alternate sections of greater and lesser porosity. In a particular embodiment exemplifying my invention, these are alternate horizontal strips of high tenacity nylon fabric of taffeta and leno weaves.

Figure 1:
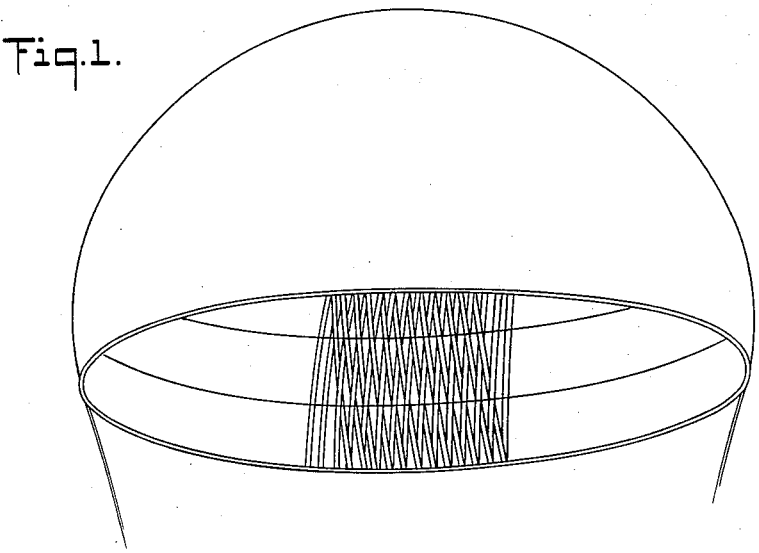
Figure 1 is a perspective view illustrating a ribbon type of parachute canopy which has heretofore been produced.

It has heretofore been suggested that parachute canopies be made of ribbons. One form of such ribbon canopy is illustrated in Figure 1, in which the canopy is shown in perspective so that the arrangement of the ribbons in a portion of the back surface may be illustrated. Each ribbon runs completely over the top of the canopy adjacent to an opening at the peak, with the ribbons crossed, as indicated.

Figure 2:
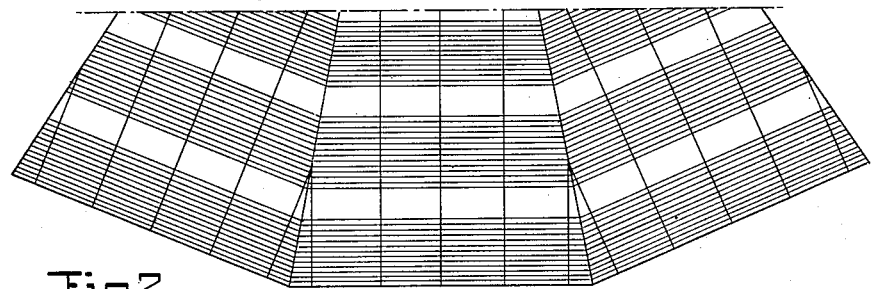
Figure 2 is a partial diagram illustrating a different form of ribbon type canopy which has heretofore been produced.

Figure 2 illustrates another type of ribbon canopy of the prior art, in which the ribbons are horizontally arranged and are sewn together by means of widely-spaced vertical ribbons.

Both of these types of canopy of Figures 1 and 2 have certain advantages over more conventional types such as are in general use. Some of these advantages are that by reason of a large number of openings, the parachutes are able to withstand opening shocks; improved stability, due to the fact that there is less tendency for the parachute to swing about the load as a pivot and less tendency to be affected by cross-currents of air—as well as other advantages which need not be mentioned, but which led to the use of considerable numbers of parachutes of these types during the war.

These types of parachute canopies also have very serious disadvantages. One is that if the ribbons become creased, the effectiveness of the parachute may be reduced. Another is that there is great danger of the shroud lines becoming entangled in the parachute canopy. A very serious disadvantage is that in the manufacture of such a canopy it is necessary to spread the canopy out to its full size, so that the ribbons may be sewn into place, not only making this an awkward and slow manufacturing process, but requiring an enormous amount of floor space for the manufacture of such parachutes in quantities. Instead, if all parachutes had been made in such a manner during the war, the floor space required would have been many times in excess of the total floor space available for the purpose of parachute manufacture.

Figure 3:
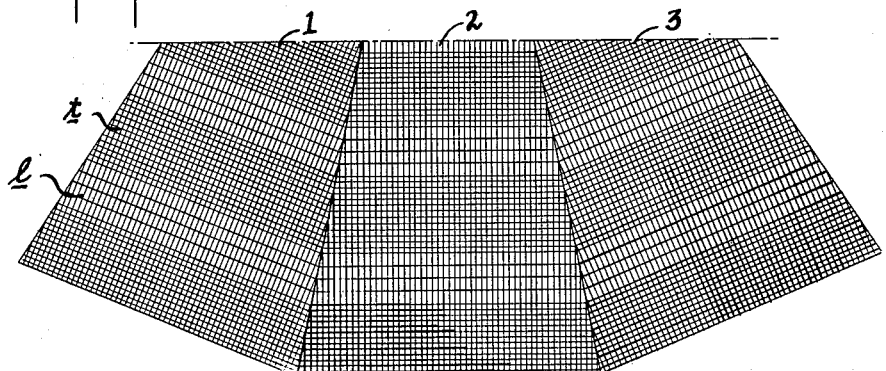
Figure 3 is a partial diagram illustrating a parachute canopy made in accordance with the present invention.
Figure 4:
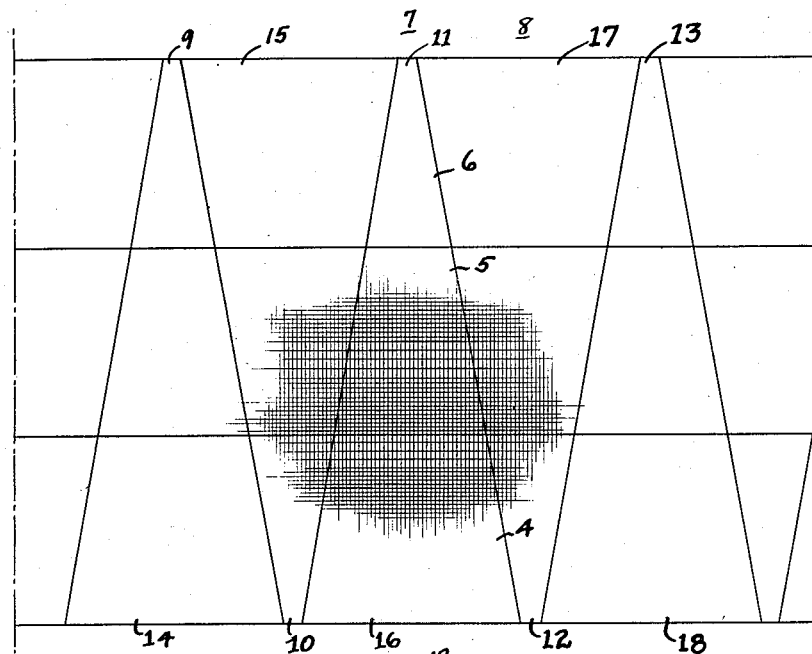
Figure 4 is a diagram illustrating may new type of canopy and the method of its manufacture.
Figure 5:
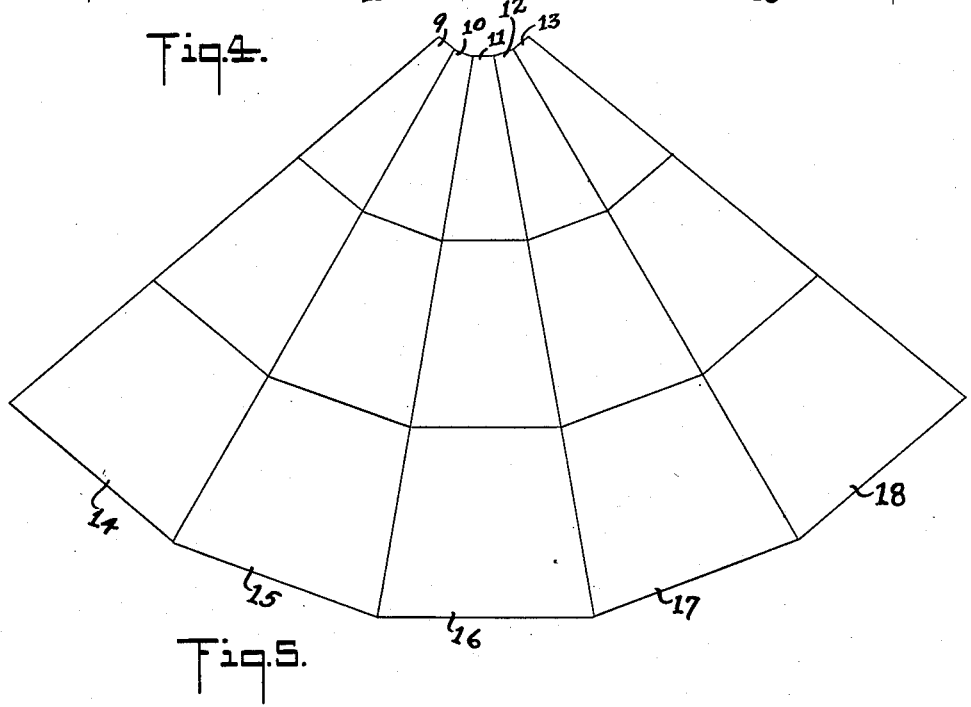
Figure 5 is a diagram illustrating the assembly of my new canopy.

Figure 3 illustrates a parachute canopy in accordance with the present invention. This canopy consists of pieces of fabric cut and sewn into gores 1, 2, and 3, each piece of fabric having alternate horizontal strips of open, or leno, weave $l$ and close, or taffeta, weave $t$. This particular canopy was made of pieces of fabric forty-six inches wide with the leno and taffeta strips running lengthwise of the fabric in the loom. The fabric was cut into trapezoidal parts, as at 4, 5, and 6, (Figure 4) sewn together to make individual trapezoidal gores, as illustrated at 7 and 8. The ends of some of these trapezoidal gores are marked with the reference numerals 9 to 18 in Figure 4, and the same ends similarly marked in Figure 5 to illustrate how these gores are sewn together to form my new canopy.

This method of cutting and assembling the parachute canopy results in a reduction, with respect to canopies of the same size and shape made by present conventional methods, of seventeen per cent in the length of the total number of cuts required and fifteen percent in the length of the seams required to be sewn.

A particular canopy so made was hemispherical in shape, with a diameter of twenty-four feet. The fabric consisted of alternate strips running parallel with the selvage of plain or taffeta weave, and leno weave, the fabric being forty-six inches wide. The plain weave strips were two and one-eighth inches in width and the leno weave strips one and one-half inches. The warp material in the plain strips consisted of seventy-five ends per inch of 210 denier high-tenacity nylon yarn, and the warp material in the leno weave strip of fifty ends per inch of 70 denier high tenacity nylon yarn. The filling material in both strips consisted of forty-eight threads per inch of 210 denier high tenacity nylon yarn.

This particular parachute was used to drop a dummy weight weighing 150 pounds from the bomb bay of a B–17 plane flying at an indicated air speed of 135 miles per hour at an altitude of 800 feet above the ground. The opening time of the chute was 7.6 seconds, and the total time of descent 20.0 seconds. There was very little oscillation and the canopy was very stable in descent. The relative humidity at the time of this test was 61%, the barometic pressure 29.01 inches, the temperature 52° F., and the wind velocity 20 miles per hour.

This manufacturing and test data is given for one particular chute to indicate to those skilled in the art the particular characteristics of the chute, so that the particular manufacturing specifications may be varied for the desired use to produce the desired result. For example, the above chute, having a very slow opening time, would be suitable as an escape chute from a high velocity plane where the opening shock should be minimized. For other conditions, such as greater or lesser loads, lesser opening shocks, slower rate of descent, etc., the size of the canopy, the number of threads per inch, kinds of yarn, relative width of leno and taffeta strips, etc., could all be varied to produce the desired results. The above test data of one particular parachute indicates to those skilled in the art the direction and degree of variation of each factor necessary to produce the desired result for each particular use that might be made of my new parachute canopy.

Figure 6:
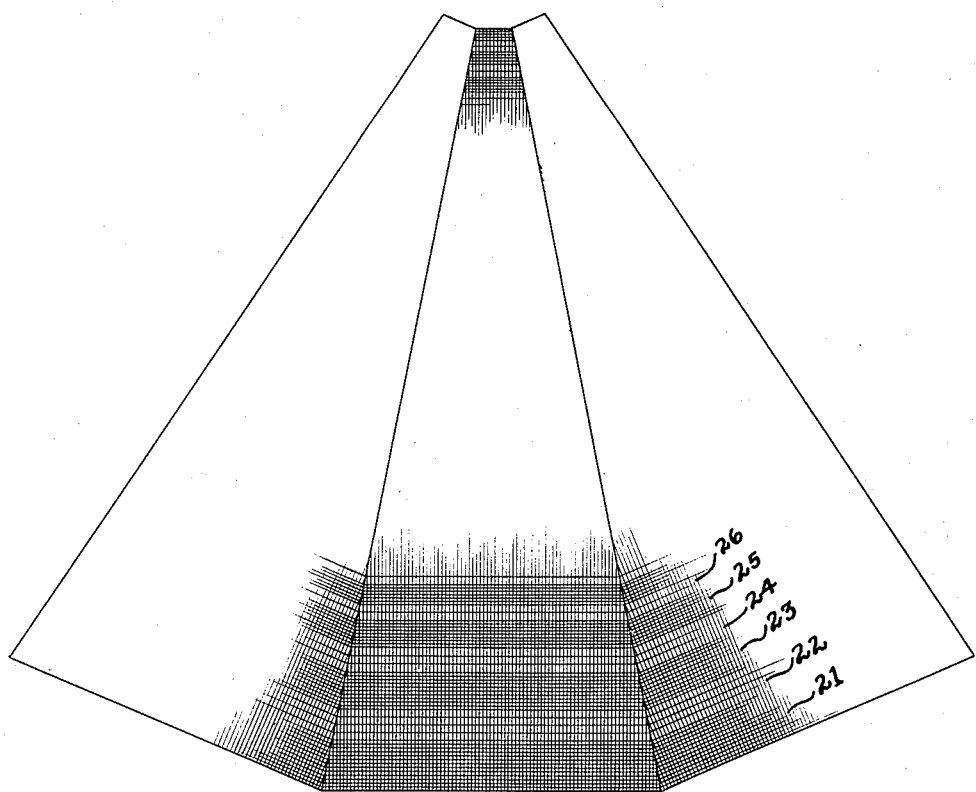
Figure 6 is a diagram illustrating my new type of canopy in which the alternating sections of dense and open weaves are graduated in width from the base to the top of the canopy.

Another form of canopy in accordance with my invention is shown in Figure 6, in which the successive strips 21 to 26 of dense and open weave are graduated in width from the base to the top. This variation may be desirable for certain uses and illustrates how the various design factor may be changed to provide the desired characteristics for any particular parachute.

My canopy has improved stability due to the fact that vents are provided over the entire surface, in addition to a central vent at the peak which may be used if desired. The stability of the canopy is further increased by the ability of these vents to permit ready passage of horizontal air currents, thereby minimizing side pressure and the danger of collapse in the case of strong winds or sudden gusts.

The ability to absorb increased opening shock is provided by the numerous porous areas distributed over the surface of the canopy, which permit trapped air to escape quickly. This characteristic is of importance in connection with the use of my canopy for escape chutes in view of steadily increasing aircraft speeds.

My canopy has an improved reliability over the types illustrated in Figures 1 and 2, in that the canopies of Figures 1 and 2 do not present a solid, uninterrupted surface, with the danger that shroud lines and fittings may become entangled in the loosely arranged ribbons which may prevent the canopy from opening completely and thereby interfere with the proper functioning of the parachute. My new canopy has a continuous smooth surface and does not offer any more risks of entanglement than standard types used successfully during the war. Also, with respect to the types of Figures 1 and 2, my canopy does not present the danger of ribbons becoming creased or rumpled and losing part or more of their effectiveness.

My canopy is capable of being manufactured by simplified manufacturing methods which are better than those currently used for standard types of parachutes, as explained above, and far superior to those for the types of Figures 1 and 2, for the reasons which have also been explained.

My new canopy has reduced servicing requirements, in that there is no danger of ribbons becoming creased or rumpled; nor is there any necessity for ironing out individual ribbons, as must be done with the types of Figures 1 and 2 before packing, after each use, and periodically even if not in use, to avoid creasing. My new canopy may be used with or without reefing gear.

It will be understood that my invention is not limited to the precise details of the particular example given, nor to the precise details shown and described. My invention contemplates the use of a continuous fabric of alternately porous and non-porous sections which may be accomplished in the weave, as described.

It might be accomplished by mechanical means, such as cutting and stamping, or by chemical means, such as burn-outs, with the edges prevented from fraying by fusing or the application of a binding agent. These methods would involve the use of a denser fabric, part of which was removed. To remove certain sections by the burn-out process, I would use a fabric of at least two components, one of which consists of fibre of such nature as to lend itself to the burn-out process, as, for example, rayon.

I might also use an essentially porous fabric and increase the density in certain sections by the application of substances which fill the interstices in the fabric, by the use of conventional textile printing facilities or by compressing the fabric in certain sections by means of high-pressure calenders and the application of heat to fabrics made of thermoplastic fibres, such as cellulose acetate.

I do not desire, therefore, to be restricted to any of the particulars described, but only within the scope of the appended claims.

What is claimed is:

1. A parachute canopy comprising continuous segments extending from the base to the top thereof, each segment comprising a continuous fabric having strips of dense and open weaves of different widths.

2. A parachute canopy comprising continuous fabric segments extending from the base to the peak thereof, each of said segments having a plurality of alternating sections of taffeta and leno weaves extending transversely of the length of the segment.

3. A parachute canopy comprising continuous fabric segments extending from the base to the peak thereof, each of said segments having a plurality of alternating sections of taffeta and leno weaves extending transversely of the length of the segment, each taffeta section of a segment having an edge contiguous with the edge of a corresponding taffeta segment in the adjacent segment, and each leno section of a segment having an edge contiguous with the edge of a corresponding leno section in the adjacent segment.

JOHN HAESLER.

REFERENCES CITED

The following references are of record in the file of this patent:

UNITED STATES PATENTS

| Number | Name | Date |
| --- | --- | --- |
| 1,164,104 | Le Doux | Dec. 14, 1915 |
| 1,873,094 | Winton | Aug. 23, 1932 |
| 1,983,451 | Gwaltney | Dec. 4, 1934 |
| 2,358,582 | Little | Sept. 19, 1944 |
| 2,384,187 | Manson | Sept. 4, 1945 |
| 2,409,562 | Hastings | Oct. 15, 1946 |

FOREIGN PATENTS

| Number | Country | Date |
| --- | --- | --- |
| 518,997 | Great Britain | Mar. 13, 1940 |
| 854,201 | France | Jan. 4, 1940 |